Patented Apr. 2, 1946

2,397,666

UNITED STATES PATENT OFFICE 2,397,666

METHOD OF PRODUCING LUMINESCENT MATERIAL

Sampson Isenberg, Chicago, Ill., assignor to General Luminescent Corporation, Chicago, Ill., a corporation of Illinois No Drawing. Application August 13, 1942, Serial No. 454,733

7 Claims. (Cl. 252—301.6)

My invention relates to a method of producing an improved luminescent zinc-cadmium sulfide.

Zinc-cadmium sulfide is employed as a luminescent material, in part at least because of the ability to modify the color by controlling the proportion of cadmium to zinc, in part because the daylight color may be made to match at least generally the luminescent color and both are restful to the eye, and in part because, by known means, the so-called lag period may be decreased. Luminescent zinc sulfide emits a greenish-yellow light when excited and luminescent cadmium sulfide a reddish light. When the double crystal luminescent zinc-cadmium sulfide is produced, an orange color results, shifting toward the red or greenish-yellow portion of the spectrum, depending upon the relative proportions of zinc and cadmium present. The daylight colors, in general, correspond to the colors of the emitted light and the narrated shift occurs in substantially the same way.

Zinc-cadmium sulfide has been employed as a luminescent material for the production of luminescent dials and the like. Such dials are employed in various ways, a recent expedient being to install them in airplanes with an arrangement such that at night the dials may be subjected to ultra-violet radiation, the resulting luminescence making it possible to read the dials readily at night. When the dials are used in this way, it is desirable that the luminescent material lose its luminescence as rapidly as possible, because otherwise, when the ultra-violet radiation is discontinued, the observer, pilot and other members of the crew will not have as clear night vision as required. Any lag or persistent glow, commonly referred to as phosphorescence, is therefore a marked disadvantage.

In producing zinc cadmium sulfide, it is a common practice to employ nickel for the purpose of decreasing after-glow. Other materials have been suggested but nickel is the most common and best known for the purpose. All substances with which I am familiar, usable for this purpose, have the effect of decreasing luminescence. Some loss in luminescence can be compensated for by increasing the proportion of luminescent material used; but, in general, problems relating to the application of the luminescent material in sufficient amounts are great enough so that little, if any, loss of luminescence can be tolerated.

I have discovered an entirely new method for reducing after-glow and my method does not involve the use of any special inhibiting materials, but comprises a method for the treatment of zinc cadmium sulfide during its production. I not only produce a material which has a very slight, almost imperceptible, lag, but one which has its luminescence substantially unimpaired and which has other advantages as will be pointed out.

In accordance with my invention, I first produce a zinc cadmium sulfide wherein the relation of zinc to cadmium or vice versa is known to be greater than desired in the final product. As an example, the relation of zinc to cadmium may be about nine to one. This suggested relationship may be modified markedly but it is illustrative of what I consider a desirable practice of my invention. This zinc cadmium sulfide may be produced in various ways known in the art.

In accordance with one method, I produce a solution containing zinc nitrate and cadmium nitrate by any known chemical means, the proportion of zinc ions to the cadmium ions being of the order of nine to one. Hydrogen sulfide is then bubbled into this solution until all of the zinc and cadmium are precipitated as the sulfides. Approximately ½% of copper may be employed as an activator in the zinc cadmium sulfide of my invention, and I may introduce the copper either by precipitating the copper as the sulfide along with the zinc and cadmium or by mixing copper sulfide with the zinc cadmium sulfide in the wet condition in which the material is found after precipitation.

Whatever the manner of introduction of the copper may be, a suitably prepared material, after being dried, is fired in a reducing atmosphere at a temperature between 900 degrees C. and 1100 degrees C. for approximately one to four hours. The temperature employed depends upon the amount of material present, the temperature being slightly increased as the mass is increased. I may, however, employ a temperature of about 1000 degrees C. and vary the time. The material is removed from the furnace, crushed and sifted, and comprises the material produced by the first step of the process, which is subsequently utilized for the production of the final material.

Another method of forming the material of the first step of the method is to introduce into the furnace a relatively finely divided, intimate mixture of materials which, on firing, will produce zinc cadmium sulfide activated with copper. Zinc and cadmium oxide may be employed as source materials for zinc and cadmium, or the carbonates may be used, or the nitrates. Ammonium sulfide may be employed as a source of sulfide ion. These are merely illustrative expedients, as various ways are known to chemists for producing zinc cadmium sulfide by a firing procedure. The temperatures may be of the same order as those referred to hereinabove but, in general, the time of reaction will be somewhat longer.

The originally produced luminescent zinc cadmium sulfide is matched against a standard and a sufficient amount of either zinc sulfide or cadmium sulfide (not activated) is mixed with the zinc cadmium sulfide to shift the shade on luminescence in the direction and to the extent required. In general, the process should be controlled so that between about 5% and 15% of unactivated zinc sulfide or cadmium sulfide will be required in this step. The mixture is ball milled or otherwise suitably treated to obtain a thorough dispersion of the zinc sulfide or cadmium sulfide and the product refired at approximately 700 degrees C. for two to four hours. The material produced as a result of this second firing step is crushed and sifted and will be found to have only a relatively slight after-glow.

In carrying out my invention, I have obtained very much better results by introducing cadmium sulfide in the second step of the process rather than zinc sulfide. It will be noted that in the example given I proposed employing a relatively large proportion of zinc as compared to cadmium. This expedient is used in order to obtain a luminescent material with less red component than desired. As a result of this controlled characteristic, the second step of the process will always involve the addition of the same sulfide, cadmium sulfide, in the example postulated. The only matter to be determined by color testing and matching, therefore, is the amount of cadmium sulfide (or zinc sulfide if the reverse procedure is followed) which should be used.

My invention permits the use of more zinc than desired in the first step, according to a standardized procedure, wherein only cadmium is required to be added in the second step, but those skilled in the art will understand that, since my method will always contemplate the addition of either cadmium sulfide or zinc sulfide to the first-produced product, there is a definite advantage of adopting a standard wherein the initial product is definitely deficient in zinc or definitely deficient in cadmium. In my operations, I have found that better results are obtained if the initial product is deficient in cadmium and unactivated cadmium sulfide is introduced into the first-prepared material, and the resulting mixture then fired to produce a final material.

I have already referred to the fact that the color of the emitted light can, in general, match the daylight color. It happens that the daylight color of cadmium sulfide is reddish and the daylight color of zinc sulfide is yellow. Addition of either cadmium sulfide or zinc sulfide to the first-prepared luminescent material, of course, has the effect of changing the daylight color also. The change in the daylight shade is more pronounced before the second firing step, that is to say, if zinc sulfide is added to the first-prepared material, it appears somewhat redder before the second firing step than afterwards. I have found, however, that, even though the effect of the introduction of the cadmium or zinc sulfide on the daylight color is less than after the firing step, the daylight color nevertheless is a guide to the operation in securing the final luminescent color desired.

As an example of the practice of my invention, I produced a luminescent zinc cadmium sulfide by the precipitation method referred to hereinabove, the zinc cadmium sulfide having a ratio of zinc to cadmium of nine to one, ½% of copper in the form of the sulfide being present as an activator. This material had an after-glow which persisted for thirty-five seconds. To one pound of this material, I added 1½ oz. of an unactivated cadmium sulfide, mixed thoroughly in a ball mil to obtain a thorough dispersion of the cadmium sulfide and fired at 700 degrees C. for two hours. After cooling, the resulting material was crushed and sifted. An inspection showed that the color on luminescence had shifted toward the red or orange part of the spectrum and that the period of phosphorescence or lag was less than ½ second. No appreciable or measurable loss of luminescence resulted, although, since there was a slight shifting of the wave length of the emitted light, there may have been a slight loss which acceptable inspection methods did not show. For all practical purposes, therefore, the material was as efficient an emitter after the second step as before. The daylight color was also shifted slightly toward the reddish or orange side of the spectrum. Thus, by the use of only a single activator and without the introduction of any inhibiting substance, I have produced a highly luminescent zinc cadmium sulfide with very little after-glow. In all instances, even though the amount of sulfide introduced on the second step is relatively small, I decrease the lag to not more than two seconds and, in general, I have found that less than 2% of the original brilliancy persists at the end of one-half a second.

The product of my invention is different in performance and comprises a different product than zinc cadmium sulfide products of the prior art. I have produced by my invention not only an improved method but an improved product particularly adapted for use in the production of dials and the like for military aircraft. I have described my invention in detail in order that those skilled in the art may practice the same, but the invention is limited only by the scope of the appended claims.

What I claim as new and desire to protect by Letters Patent of the United States is:

1. A method of producing a luminescent zinc cadmium sulfide, which comprises first producing a luminescent zinc cadmium sulfide, then mixing said luminescent zinc cadmium sulfide with a substance of the class consisting of zinc sulfide and cadmium sulfide, and then firing the mixture.

2. A method of producing a luminescent zinc cadmium sulfide, which comprises first producing a copper activated luminescent zinc cadmium sulfide, then mixing said luminescent zinc cadmium sulfide with a substance of the class consisting of zinc sulfide and cadmium sulfide, and then firing the mixture.

3. The method of decreasing the lag of luminescent zinc cadmium sulfide which comprises mixing said zinc cadmium sulfide with a substance of the class consisting of zinc sulfide and cadmium sulfide and then firing the mixture.

4. The method of producing zinc cadmium sulfide which comprises mixing together substances which on firing will produce copper activated zinc cadmium sulfide with the relation of zinc to cadmium of the order of nine to one, firing said mixture, mixing the resulting material with a proportion of cadmium sulfide sufficient to shift the emitted light a desirable amount toward the red end of the spectrum, and then firing the mixture.

5. The method of producing zinc cadmium sulfide which comprises mixing together substances which on firing will produce copper activated zinc cadmium sulfide with the relation of zinc to cadmium of the order of nine to one, firing said mixture, mixing the resulting material with a proportion of cadmium sulfide sufficient to shift the emitted light a desirable amount toward the red end of the spectrum, the proportion of cadmium sulfide added being between five and fifteen percent of the weight of the zinc cadmium sulfide, and then firing the mixture.

6. A method of producing a luminescent zinc cadmium sulfide, which comprises first producing an activated luminescent zinc cadmium sulfide, then mixing said activated luminescent zinc cadmium sulfide with a minor proportion of a substance of the class consisting of unactivated zinc sulfide and cadmium sulfide, and then firing the mixture.

7. The method of decreasing the lag of luminescent zinc cadmium sulfide, which comprises mixing activated zinc cadmium sulfide with a minor proportion of a substance selected from the class consisting of unactivated zinc sulfide and cadmium sulfide, and then firing the mixture.

SAMPSON ISENBERG.